(12) United States Patent
Li

(10) Patent No.: US 11,380,176 B2
(45) Date of Patent: Jul. 5, 2022

(54) COMPUTING DEVICE AND NON-TRANSITORY STORAGE MEDIUM IMPLEMENTING TARGET TRACKING METHOD

(71) Applicant: HON HAI PRECISION INDUSTRY CO., LTD., New Taipei (TW)

(72) Inventor: Nien-Che Li, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 98 days.

(21) Appl. No.: 16/935,525

(22) Filed: Jul. 22, 2020

(65) Prior Publication Data

US 2021/0142634 A1 May 13, 2021

(30) Foreign Application Priority Data

Nov. 7, 2019 (CN) .......................... 201911081299.7

(51) Int. Cl.
| | | |
|---|---|---|
| *G06K 9/00* | (2022.01) | |
| *G08B 13/196* | (2006.01) | |
| *G05D 1/00* | (2006.01) | |
| *G06T 7/292* | (2017.01) | |
| *G05D 1/12* | (2006.01) | |

(52) U.S. Cl.
CPC ..... *G08B 13/19608* (2013.01); *G05D 1/0094* (2013.01); *G05D 1/12* (2013.01); *G06T 7/292* (2017.01); *G08B 13/19621* (2013.01); *G08B 13/19645* (2013.01); *G06T 2207/30232* (2013.01)

(58) Field of Classification Search
CPC ........ G08B 13/19608; G08B 13/19621; G08B 13/19645; G05D 1/0094; G05D 1/12; G06T 7/292; G06T 2207/30232; G06T 2207/10032; H04N 5/23218; H04N 5/23299; H04N 5/247; B64D 47/08
USPC .......................................................... 382/103
See application file for complete search history.

(56) References Cited

U.S. PATENT DOCUMENTS

| | | | |
|---|---|---|---|
| 8,063,945 B2* | 11/2011 | Hoshino | H04N 5/232945 348/222.1 |
| 9,785,147 B1* | 10/2017 | McDermott | G06V 40/103 |
| 9,967,470 B2* | 5/2018 | Paz | H04N 7/185 |
| 10,055,853 B1* | 8/2018 | Fisher | G06T 7/248 |
| 10,354,407 B2* | 7/2019 | Lablans | H04N 5/2251 |

(Continued)

FOREIGN PATENT DOCUMENTS

| | | | | |
|---|---|---|---|---|
| CA | 2723983 A1 * | 11/2009 | ................ | G01J 5/02 |
| CA | 3011476 A1 * | 2/2019 | ........... | B64C 39/024 |

(Continued)

*Primary Examiner* — Mahendra R Patel
(74) *Attorney, Agent, or Firm* — ScienBiziP, P.C.

(57) ABSTRACT

A target tracking method includes receiving an initial video of a number of targets to be tracked acquired by a first mobile camera device, identifying the number of targets to be tracked in the initial video, tracking the plurality of targets to be tracked, and determining whether all of the targets to be tracked are within a tracking range of the first mobile camera device. If at least one target to be tracked is not within the tracking range of the first mobile camera device, at least one second mobile camera device is controlled to track the at least one target to be tracked that is not within the tracking range of the first mobile camera device.

18 Claims, 4 Drawing Sheets

(56) References Cited

U.S. PATENT DOCUMENTS

| | | | | |
|---|---|---|---|---|
| 10,798,302 B2* | 10/2020 | Zhang | | H04M 1/72454 |
| 2005/0063566 A1* | 3/2005 | Beek | | A61B 5/1176 |
| | | | | 382/115 |
| 2007/0035627 A1* | 2/2007 | Cleary | | G08B 13/19663 |
| | | | | 348/159 |
| 2007/0039030 A1* | 2/2007 | Romanowich | | H04N 5/247 |
| | | | | 725/105 |
| 2011/0249101 A1* | 10/2011 | Lee | | H04N 7/188 |
| | | | | 348/50 |
| 2012/0249802 A1* | 10/2012 | Taylor | | G06T 7/11 |
| | | | | 348/169 |
| 2016/0189391 A1* | 6/2016 | Demartin | | H04N 9/8205 |
| | | | | 382/103 |
| 2017/0019574 A1* | 1/2017 | Yang | | H04N 5/2256 |
| 2017/0180636 A1* | 6/2017 | Li | | G06K 9/00248 |
| 2017/0330346 A1* | 11/2017 | Oshima | | H04N 5/23203 |
| 2018/0362185 A1* | 12/2018 | Qian | | B64C 39/024 |
| 2020/0013181 A1* | 1/2020 | Uyeno | | G01S 17/66 |
| 2020/0336722 A1* | 10/2020 | Gibbon | | G11B 27/031 |
| 2021/0044756 A1* | 2/2021 | Kimura | | H04N 5/232125 |

FOREIGN PATENT DOCUMENTS

| | | | | | |
|---|---|---|---|---|---|
| CN | 104581083 A | * | 4/2015 | | |
| CN | 109960145 A | * | 7/2019 | | |
| CN | 109996039 A | * | 7/2019 | | |
| CN | 109996039 A | | 7/2019 | | |
| CN | 110166600 A | * | 8/2019 | | |
| JP | 2005012556 A | * | 1/2005 | | |
| WO | WO-2006089776 A1 | * | 8/2006 | | G08B 13/194 |
| WO | 2011004681 A1 | | 1/2011 | | |
| WO | WO-2011004681 A | * | 1/2011 | | H01L 23/3121 |
| WO | WO-2017008422 A1 | * | 1/2017 | | H04N 7/18 |
| WO | WO-2020085524 A1 | * | 4/2020 | | H04M 1/725 |

* cited by examiner

COMPUTING DEVICE AND NON-TRANSITORY STORAGE MEDIUM IMPLEMENTING TARGET TRACKING METHOD

FIELD

The subject matter herein generally relates to target tracking methods, and more particularly to a target tracking method for tracking a plurality of targets.

BACKGROUND

In the existing drone tracking methods, a drone can only track one target at a time. When a large number of drones are needed to track a plurality of targets, mutual interference or collision accidents may occur with the drones. Thus, a method for tracking a plurality of targets is desired.

BRIEF DESCRIPTION OF THE DRAWINGS

Implementations of the present disclosure will now be described, by way of embodiments, with reference to the attached figures.

DETAILED DESCRIPTION

Figure 1:
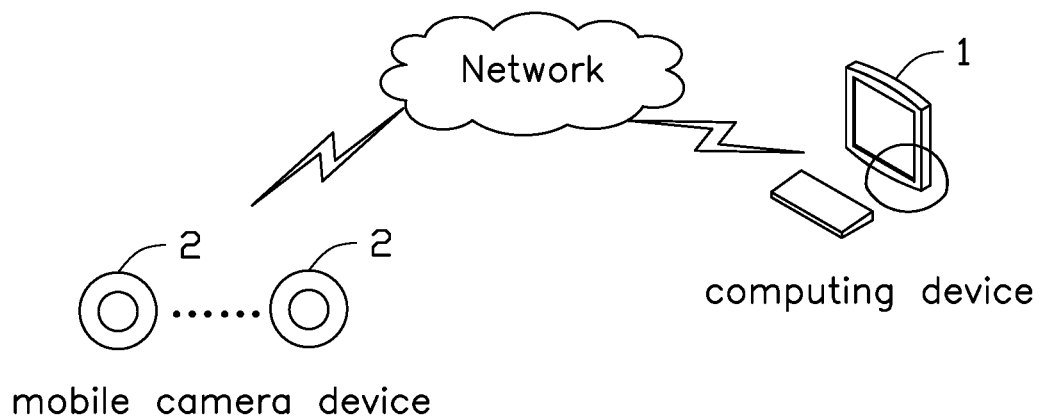
FIG. 1 is a schematic diagram of an application environment of a target tracking method.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows a schematic diagram of an application environment of a target tracking method.

The target tracking method is applied to a computing device 1 which establishes a communication connection with at least two mobile camera devices 2 through a network. The computing device 1 can receive a video collected by a first mobile camera device, identify targets to be tracked in the video, and determine whether to control at least one second mobile camera device to track at least one target that is no longer in a tracking range of the first mobile camera device. The mobile camera devices 2 are capable of moving and tracking a target to be tracked. The network may be a wireless network, such as radio, wireless fidelity (WIFI), cellular, satellite, broadcast, and the like.

The computing device 1 may be an electronic device, such as a personal computer, a server, or the like in which target tracking software is installed. The server may be a single server, a server cluster, or a cloud server.

In another embodiment, the target tracking method may be directly applied to the first mobile camera device, that is, the first mobile camera device implements the functions of collecting a video, identifying targets to be tracked in the video, and determining whether to control the at least one second mobile camera device to track at least one target that is no longer in the tracking range of the first mobile camera device. For example, the first mobile camera device in which the target tracking software is installed establishes a communication connection with the at least one second mobile camera device through a wireless network. The first mobile camera device is used to track multiple targets. When at least one target is no longer in the tracking range of the first mobile camera device, the first mobile camera device sends feature information of the at least one target to the at least one second mobile camera device. The feature information of the at least one target is then tracked by the at least one second mobile camera device.

The mobile camera device 2 may be an unmanned aerial vehicle having a function of flying and tracking, or an electronic device such as a camera or a monitor having a function of moving and tracking.

Figure 2:
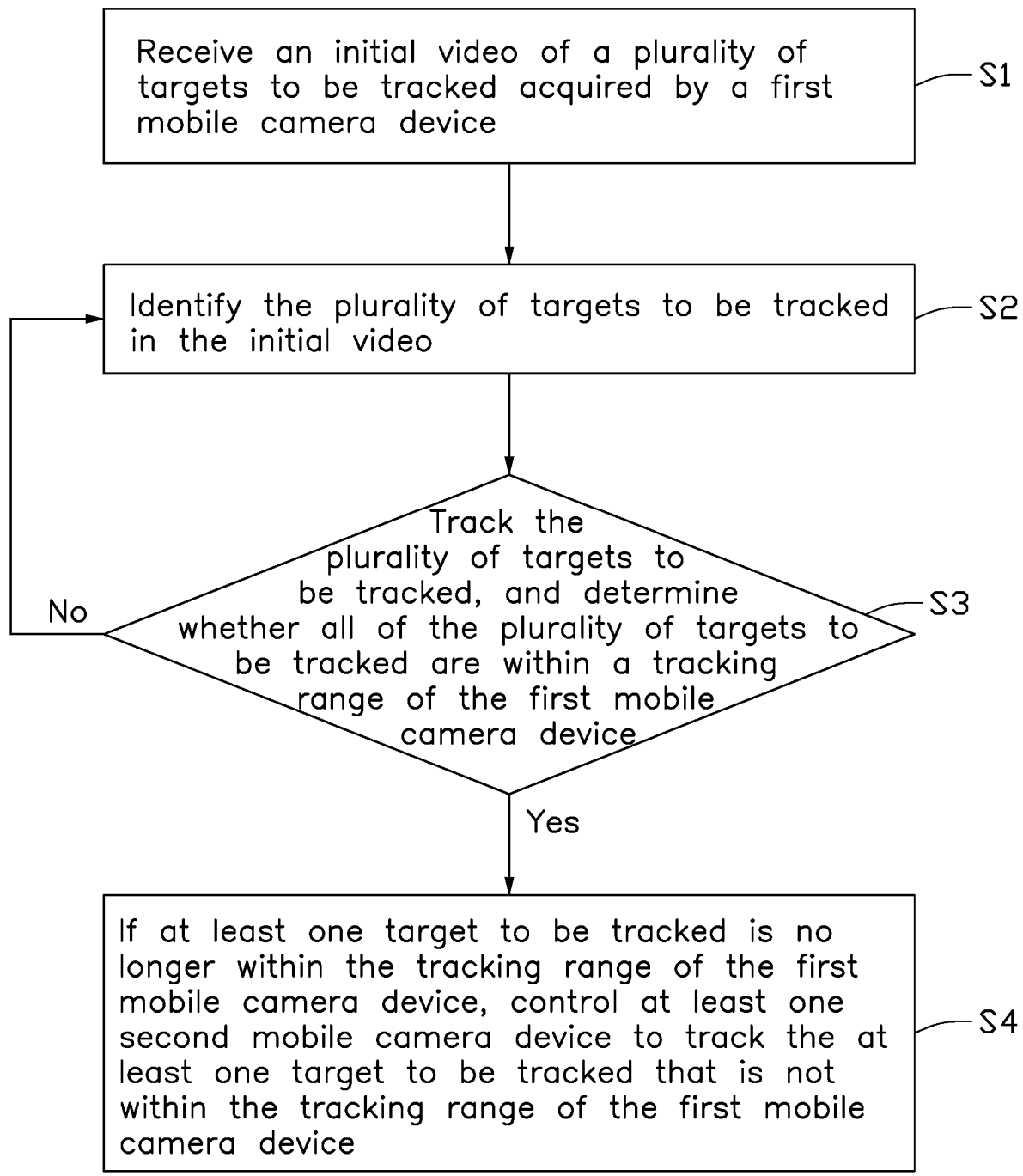
FIG. 2 is a flowchart diagram of the target tracking method.

FIG. 2 shows a flowchart of the target tracking method. According to different requirements, the order of blocks in the flowchart can be changed, and some blocks can be omitted or combined.

Block S1: An initial video of a plurality of targets to be tracked acquired by the first mobile camera device is received.

In one embodiment, the computing device 1 receives the initial video of the plurality of targets to be tracked collected by the first mobile camera device, and the initial video may be transmitted through a fifth-generation mobile communication technology or a WIFI network.

For example, at a starting point of a marathon, the first mobile camera device is located above the starting point and captures an initial video of multiple runners at the starting point, and sends the initial video of the multiple runners to the computing device 1.

Block S2: The plurality of targets to be tracked in the initial video is identified.

The computing device 1 identifies the plurality of targets to be tracked in the initial video according to an image recognition method. For example, in a marathon, the computing device 1 receives an initial video from a starting point of the marathon and identifies feature information of different runners in the initial video. The feature information can be number tags of the runners in the initial video. In another example, in a race car competition, the computing device 1 receives an initial video from a starting point and identifies feature information of different race cars in the initial video. The feature information includes one or more types of information such as a license plate, color, and text of the race car.

Block S3: The plurality of targets to be tracked is tracked, and whether all of the plurality of targets to be tracked are within a tracking range of the first mobile camera device is determined.

In one embodiment, a method of tracking the plurality of targets to be tracked and determining whether all of the plurality of targets to be tracked are within the tracking range of the first mobile camera device may include the following:

Receiving first tracking videos captured by the first mobile camera device at preset time intervals, and searching for feature information of the plurality of targets to be tracked in an image frame of the first tracking videos to determine whether all of the plurality of targets to be tracked are within the tracking range of the first mobile camera device. In one embodiment, a flying/moving speed of the first mobile camera device is equal to an average speed of the plurality of targets to be tracked.

For example, the computing device 1 receives an initial video from the first mobile camera device from a starting position of a marathon, identifies number tags of runners in the initial video, receives first tracking videos from the first mobile camera device at preset time intervals, and searches for the number tags of all of the runners in an image frame of the first tracking videos to determine whether all of the runners to be tracked are within the tracking range of the first mobile camera device. In order to track the most targets in the first tracking videos, a flying speed of the first mobile camera device is equal to an average speed of the runners to be tracked.

Block S4: If at least one target to be tracked is no longer found in the first tracking videos, the at least one target to be tracked is determined to be not within the tracking range of the first mobile camera device, and the at least one second mobile camera device is controlled to track the at least one target to be tracked that is not within the tracking range of the first mobile camera device.

In one embodiment, the computing device 1 sends the feature information of the at least one target to be tracked that is no longer within the tracking range of the first mobile camera device to the at least one second mobile camera device to track the at least one target to be tracked that is no longer within the tracking range of the first mobile camera device.

In another embodiment, the computing device 1 further sends a movement direction of the at least one target to be tracked to the at least one second mobile camera device. The movement direction is a direction of movement of the at least one target to be tracked relative to the first mobile camera device centered on an orientation of the first mobile camera device. If the at least one second mobile camera device does not obtain an instruction to track a target to be tracked, the at least one second mobile camera device maintains a preset distance from the first mobile camera device.

In another embodiment, when the at least one second mobile camera device is controlled to track the at least one target to be tracked that is no longer within the tracking range of the first mobile camera device, the method further includes:

Sending a second tracking video acquired by the at least one second mobile camera device to the computing device 1, and determining according to the second tracking video whether a target in the second tracking video is the same as the at least one target to be tracked that is not within the tracking range of the first mobile camera device.

For example, the computing device 1 receives the second tracking video acquired by the at least one second mobile camera device flying in accordance with the movement direction of the at least one target to be tracked, identifies feature information in an image frame of the second tracking video, and compares the feature information of the second tracking video received from the at least one second mobile camera device to the feature information of the at least one target to be tracked received from the first mobile camera device. If the feature information of the second tracking video received from the at least one second mobile camera device is the same as the feature information of the at least one target to be tracked received from the first mobile camera device, the at least one second mobile camera device is controlled to continue to acquire the second tracking videos of the at least one target to be tracked in real time. If the feature information of the second tracking video received from the at least one second mobile camera device is not the same as the feature information of the at least one target to be tracked received from the first mobile camera device, the feature information of the at least one target to be tracked received from the first mobile camera device is searched in videos acquired by other second mobile camera devices in communication with the first mobile camera device.

For example, the computing device 1 determines that a first runner with number tag 5 and a second runner with number tag 65 are not within the tracking range of the first mobile camera device. Feature information and movement directions of the first and second runners are sent to a second mobile camera device 001 and a second mobile camera device 002, respectively. The feature information includes at least one of the number tag, appearance, and clothing characteristics of the runner. The movement direction of the first runner is 35° in front to the right of the first mobile camera device, and the movement direction of the second runner is 30° behind to the left of the first mobile camera device.

An example of a method of tracking the first runner by the second mobile camera device 001 is described.

The second mobile camera device 001 obtains the movement direction of the first runner and flies in accordance with the movement direction, acquires a second tracking video of the first runner during flight, and sends the acquired second tracking video to the computing device 1. The computing device 1 searches for the feature information of the first runner in an image frame of the second tracking video. If the second tracking video contains the feature information of the first runner, the computing device 1 sends an instruction to the second mobile camera device 001 to continuously track the first runner at every preset time interval. If the computing device 1 does not find the feature information of the first runner in the second tracking video within a preset time, the computing device 1 searches for the feature information of the first runner in videos acquired by other second mobile camera devices. If the feature information of the first runner is still not found, a prompt is sent by SMS, instant messaging, phone, email, or the like.

A method of tracking the second runner by the second mobile camera device 002 is the same as described above, and will not be discussed further.

Figure 3:
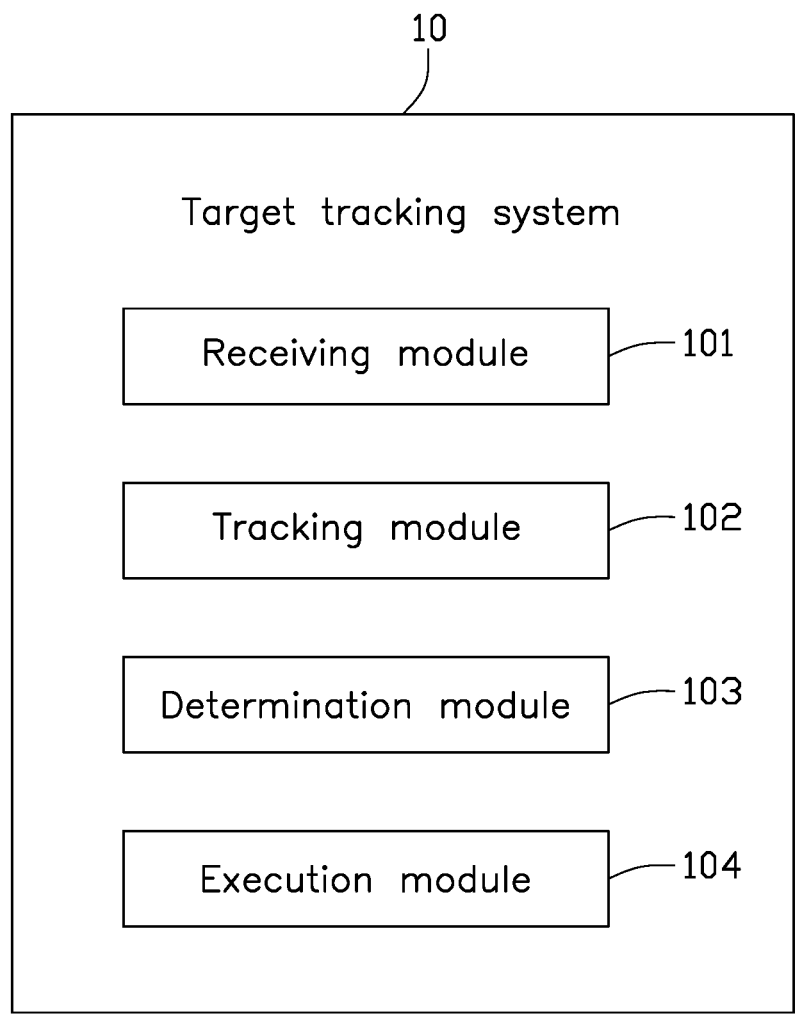
FIG. 3 is a block diagram of function modules of a target tracking system.

FIG. 3 is a block diagram of an embodiment of a target tracking system 10. The target tracking system 10 runs in a computing device, such as the computing device 1. The computing device is in communication connection with a plurality of mobile camera devices via a network. The target tracking system 10 may include a plurality of function modules composed of program code segments. Program codes of each program code segment may be stored in a memory of the computing device and executed by at least one processor to implement functions of the target tracking system 10. In one embodiment, the target tracking system 10 may be divided into a plurality of function modules according to functions performed by the target tracking system 10. The plurality of function modules may include a receiving module 101, a tracking module 102, a determination module 103, and an execution module 104.

The receiving module 101 is configured to receive the initial video of the plurality of targets to be tracked acquired by the first mobile camera device. Functions of the receiving module 101 are described in block S1, and will not be discussed further.

The tracking module 102 is configured to identify the plurality of targets to be tracked in the initial video. Functions of the tracking module 102 are described in block S2, and will not be discussed further.

The determination module 103 is configured to determine whether all of the plurality of targets to be tracked are within the tracking range of the first mobile camera device. Functions of the determination module 103 are described in block S3, and will not be discussed further.

The execution module 104 is configured to determine that at least one target to be tracked is not within the tracking range of the first mobile camera device if the at least one target to be tracked is no longer found in the first tracking videos, and control the at least one second mobile camera device to track the at least one target to be tracked that is not within the tracking range of the first mobile camera device. Functions of the execution module 104 are described in block S4, and will not be discussed further.

Figure 4:
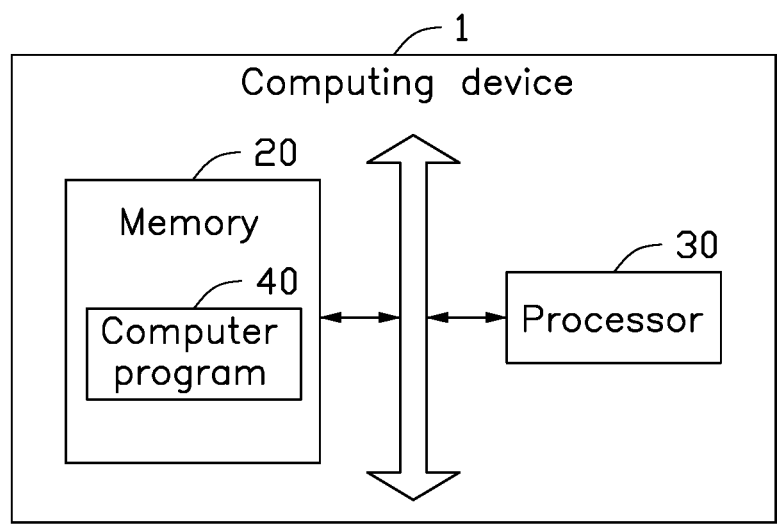
FIG. 4 is a schematic diagram of a computing device.

FIG. 4 is a schematic diagram of the computing device 1. The computing device 1 includes a memory 20, a processor 30, and a computer program 40. The computer program 40 is stored in the memory 20 and executable by the processor 30. When the processor 30 executes the computer program 40, the blocks S1-S4 in the target tracking method may be implemented. Alternatively, when the processor 30 executes the computer program 40, the functions of the function modules 101-104 in the target tracking system 10 may be implemented.

Those skilled in the art should understand that the schematic diagram of the computing device 1 does not constitute a limitation of the computing device 1. The computing device 1 may include more or fewer components than shown, or may combine some components. For example, the computing device 1 may further include an input-output device, a network access device, a bus, and the like.

The processor 30 may be a central processing unit (CPU), or may be other general-purpose processors, digital signal processors (DSPs), application specific integrated circuits (ASICs), a Field-Programmable Gate Array (FPGA), or other programmable logic devices, discrete gate or transistor logic devices, discrete hardware components, etc. The general-purpose processor may be a microprocessor, or the processor 30 may be any conventional processor, etc. The processor 30 is a control center of the computing device 1 and uses various interfaces and lines to connect various parts of the computing device 1.

The memory 20 may be configured to store the computer program 40, and the processor 30 may execute the computer program 40. The data in the memory 20 may realize various functions of the computing device 1. The memory 20 may mainly include a storage program area and a storage data area, wherein the storage program area may store an operating system, at least one application required by a function (such as a sound playback function, an image playback function, etc.). The storage data area may store data (such as audio data) and the like created according to the use of the computing device 1. In addition, the memory 20 may include a high-speed random access memory, and may also include a non-volatile memory, such as a hard disk, an internal memory, a plug-in hard disk, a smart media card (SMC), a secure digital (SD) card, flash card, at least one disk storage device, flash memory device, or other non-volatile solid-state storage device.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A target tracking method comprising:
    receiving an initial video of a plurality of targets to be tracked acquired by a first mobile camera device;
    identifying the plurality of targets to be tracked in the initial video;
    tracking the plurality of targets to be tracked, and determining whether all of the plurality of targets to be tracked are within a tracking range of the first mobile camera device;
    if at least one target to be tracked is not within the tracking range of the first mobile camera device, controlling at least one second mobile camera device to track the at least one target to be tracked that is not within the tracking range of the first mobile camera device; and
    wherein when the at least one second mobile camera device does not receive an instruction to track at least one of the plurality of targets to be tracked, the at least one second mobile camera device maintains a preset distance from the first mobile camera device.

2. The target tracking method of claim 1, wherein a method of tracking the plurality of targets to be tracked and determining whether all of the plurality of targets to be tracked are within the tracking range of the first mobile camera device comprises:
    identifying feature information of the plurality of targets to be tracked in the initial video;
    receiving first tracking videos captured by the first mobile camera device at preset time intervals; and
    searching for the feature information of the plurality of targets to be tracked in an image frame of the first tracking videos to determine whether all of the plurality of targets to be tracked are within the tracking range of the first mobile camera device.

3. The target tracking method of claim 2, wherein if at least one target to be tracked is not within the tracking range of the first mobile camera device, a method of controlling the at least one second mobile camera device to track the at least one target to be tracked that is not within the tracking range of the first mobile camera device comprises:

sending the feature information of the at least one target to be tracked that is not within the tracking range of the first mobile camera device to the at least one second mobile camera device to track the at least one target to be tracked.

4. The target tracking method of claim 3, wherein if at least one target to be tracked is not within the tracking range of the first mobile camera device, a method of controlling the at least one second mobile camera device to track the at least one target to be tracked that is not within the tracking range of the first mobile camera device further comprises:

sending a movement direction of the at least one target to be tracked to the at least one second mobile camera device; wherein the movement direction is a direction of movement of the at least one target to be tracked relative to the first mobile camera device centered on an orientation of the first mobile camera device.

5. The target tracking method of claim 4, further comprising:

obtaining a second tracking video acquired by the at least one second mobile camera device flying in accordance with the movement direction of the at least one target to be tracked;

identifying feature information in an image frame of the second tracking video acquired by the at least one second mobile camera device, and comparing the feature information of the second tracking video received from the at least one second mobile camera device to the feature information of the at least one target to be tracked received from the first mobile camera device;

if the feature information of the second tracking video received from the at least one second mobile camera device is the same as the feature information of the at least one target to be tracked received from the first mobile camera device, controlling the at least one second mobile camera device to continuously acquire the second tracking video of the at least one target to be tracked every preset time interval; and if the feature information of the second tracking video received from the at least one second mobile camera device is not the same as the feature information of the at least one target to be tracked received from the first mobile camera device, searching for the feature information of the at least one target to be tracked in videos acquired by other second mobile camera devices.

6. The target tracking method of claim 1, wherein:
a flying speed of the first mobile camera device is equal to an average speed of the plurality of targets to be tracked.

7. A computing device comprising:
a processor; and
a memory storing a plurality of instructions, which when executed by the processor, cause the processor to:
receive an initial video of a plurality of targets to be tracked acquired by a first mobile camera device;
identify the plurality of targets to be tracked in the initial video;
track the plurality of targets to be tracked, and determine whether all of the plurality of targets to be tracked are within a tracking range of the first mobile camera device;
if at least one target to be tracked is not within the tracking range of the first mobile camera device, control at least one second mobile camera device to track the at least one target to be tracked that is not within the tracking range of the first mobile camera device; and wherein when the at least one second mobile camera device does not receive an instruction to track at least one of the plurality of targets to be tracked, the at least one second mobile camera device maintains a preset distance from the first mobile camera device.

8. The computing device of claim 7, wherein the processor determines whether all of the plurality of targets to be tracked are within the tracking range of the first mobile camera device by:

identifying feature information of the plurality of targets to be tracked in the initial video;
receiving first tracking videos captured by the first mobile camera device at preset time intervals; and
searching for the feature information of the plurality of targets to be tracked in an image frame of the first tracking videos to determine whether all of the plurality of targets to be tracked are within the tracking range of the first mobile camera device.

9. The computing device of claim 8, wherein if at least one target to be tracked is not within the tracking range of the first mobile camera device, the processor controls the at least one second mobile camera device to track the at least one target to be tracked that is not within the tracking range of the first mobile camera device by:

sending the feature information of the at least one target to be tracked that is not within the tracking range of the first mobile camera device to the at least one second mobile camera device to track the at least one target to be tracked.

10. The computing device of claim 9, wherein if at least one target to be tracked is not within the tracking range of the first mobile camera device, the processor further controls the at least one second mobile camera device to track the at least one target to be tracked that is not within the tracking range of the first mobile camera device by:

sending a movement direction of the at least one target to be tracked to the at least one second mobile camera device; wherein the movement direction is a direction of movement of the at least one target to be tracked relative to the first mobile camera device centered on an orientation of the first mobile camera device.

11. The computing device of claim 10, wherein the processor is further configured to:
obtain a second tracking video acquired by the at least one second mobile camera device flying in accordance with the movement direction of the at least one target to be tracked;
identify feature information in an image frame of the second tracking video acquired by the at least one second mobile camera device, and compare the feature information of the second tracking video received from the at least one second mobile camera device to the feature information of the at least one target to be tracked received from the first mobile camera device;
if the feature information of the second tracking video received from the at least one second mobile camera device is the same as the feature information of the at least one target to be tracked received from the first mobile camera device, control the at least one second mobile camera device to continuously acquire the second tracking video of the at least one target to be tracked every preset time interval; and
if the feature information of the second tracking video received from the at least one second mobile camera device is not the same as the feature information of the at least one target to be tracked received from the first mobile camera device, search for the feature information of the at least one target to be tracked in videos acquired by other second mobile camera devices.

12. The computing device of claim 7, wherein:
a flying speed of the first mobile camera device is equal to an average speed of the plurality of targets to be tracked.

13. A non-transitory storage medium having stored thereon instructions that, when executed by a processor of a computing device, causes the processor to perform a target tracking method, wherein the method comprises:
receiving an initial video of a plurality of targets to be tracked acquired by a first mobile camera device;
identifying the plurality of targets to be tracked in the initial video;
tracking the plurality of targets to be tracked, and determining whether all of the plurality of targets to be tracked are within a tracking range of the first mobile camera device;
if at least one target to be tracked is not within the tracking range of the first mobile camera device, controlling at least one second mobile camera device to track the at least one target to be tracked that is not within the tracking range of the first mobile camera device; and
wherein when the at least one second mobile camera device does not receive an instruction to track at least one of the plurality of targets to be tracked, the at least one second mobile camera device maintains a preset distance from the first mobile camera device.

14. The non-transitory storage medium of claim 13, wherein a method of determining whether all of the plurality of targets to be tracked are within the tracking range of the first mobile camera device comprises:
identifying feature information of the plurality of targets to be tracked in the initial video;
receiving first tracking videos captured by the first mobile camera device at preset time intervals; and
searching for the feature information of the plurality of targets to be tracked in an image frame of the first tracking videos to determine whether all of the plurality of targets to be tracked are within the tracking range of the first mobile camera device.

15. The non-transitory storage medium of claim 14, wherein if at least one target to be tracked is not within the tracking range of the first mobile camera device, a method of controlling the at least one second mobile camera device to track the at least one target to be tracked that is not within the tracking range of the first mobile camera device comprises:
sending the feature information of the at least one target to be tracked that is not within the tracking range of the first mobile camera device to the at least one second mobile camera device to track the at least one target to be tracked.

16. The non-transitory storage medium of claim 15, wherein if at least one target to be tracked is not within the tracking range of the first mobile camera device, a method of controlling the at least one second mobile camera device to track the at least one target to be tracked that is not within the tracking range of the first mobile camera device further comprises:
sending a movement direction of the at least one target to be tracked to the at least one second mobile camera device; wherein the movement direction is a direction of movement of the at least one target to be tracked relative to the first mobile camera device centered on an orientation of the first mobile camera device.

17. The non-transitory storage medium of claim 16, the method further comprising:
obtaining a second tracking video acquired by the at least one second mobile camera device flying in accordance with the movement direction of the at least one target to be tracked;
identifying feature information in an image frame of the second tracking video acquired by the at least one second mobile camera device, and comparing the feature information of the second tracking video received from the at least one second mobile camera device to the feature information of the at least one target to be tracked received from the first mobile camera device;
if the feature information of the second tracking video received from the at least one second mobile camera device is the same as the feature information of the at least one target to be tracked received from the first mobile camera device, controlling the at least one second mobile camera device to continuously acquire the second tracking video of the at least one target to be tracked every preset time interval; and
if the feature information of the second tracking video received from the at least one second mobile camera device is not the same as the feature information of the at least one target to be tracked received from the first mobile camera device, searching for the feature information of the at least one target to be tracked in videos acquired by other second mobile camera devices.

18. The non-transitory storage medium of claim 13, wherein:
a flying speed of the first mobile camera device is equal to an average speed of the plurality of targets to be tracked.

* * * * *